G. WAGNER.
Ventilator for Windows.
No. 160,066 Patented Feb. 23, 1875.
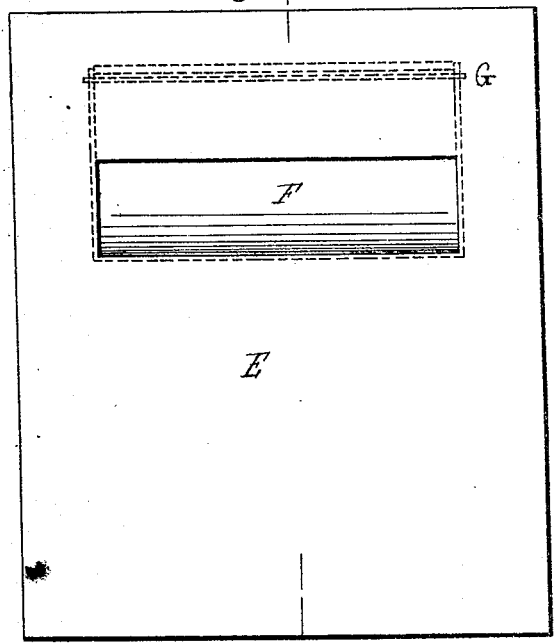
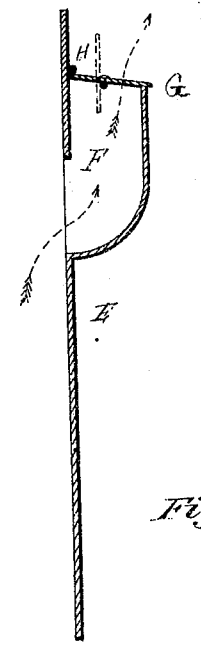
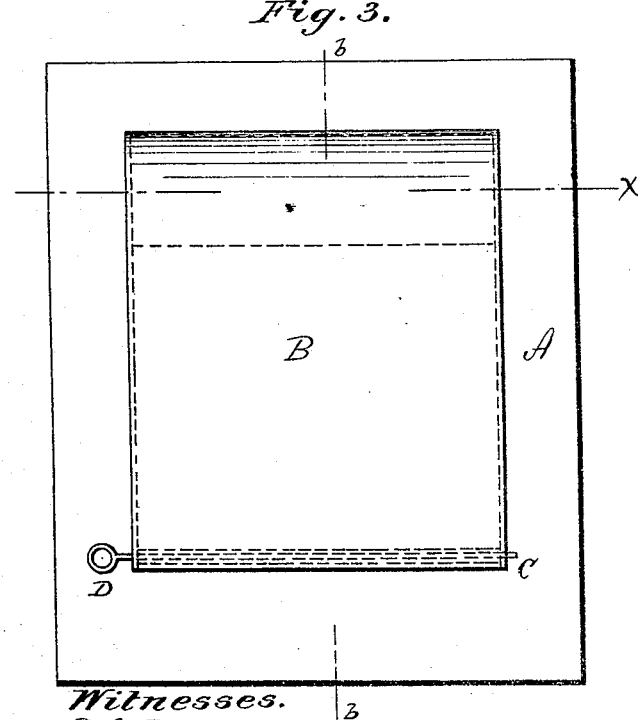
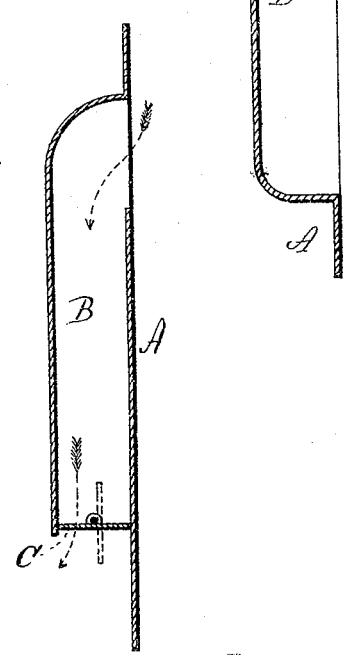
Witnesses.
H. S. Tinley
Thomas J. Godwin
Inventor:
George Wagner.
By Theodore Munger
His Atty.

UNITED STATES PATENT OFFICE.

GEORGE WAGNER, OF WASHINGTON, DISTRICT OF COLUMBIA.

IMPROVEMENT IN VENTILATORS FOR WINDOWS.

Specification forming part of Letters Patent No. 160,066, dated February 23, 1875; application filed February 6, 1875.

*To all whom it may concern:*

Be it known that I, GEORGE WAGNER, of the city of Washington and District of Columbia, have invented certain new and useful Improvements in Ventilators for Windows; and I hereby declare the following to be a full, clear, and exact description of the same, reference being had to the accompanying drawing making a part of this specification, in which—

Figure 1 is an inside elevation of a pane of glass provided with my improved foul-air escape. Fig. 2 is a sectional view of Fig. 1 through line $a\,a$. Fig. 3 is an inside elevation of a pane of glass provided with my improved induction-flue for admitting fresh air to a room. Fig. 4 is a sectional view of Fig. 3 through line $b\,b$, and Fig. 5 is a transverse sectional view of Fig. 3 through line $x\,x$.

This invention relates to an improvement in ventilators for windows; and it consists, first, of a pane of glass having on its inside a transparent box-flue communicating with the outside, opening downwardly into the room, and provided with a damper for opening and closing the said flue, for the purposes of admitting fresh air to a room and of regulating the admission of the same. It consists, secondly, of a pane of glass having on its outside a transparent box-flue communicating with the inside, opening upwardly therefrom, and provided with a damper for opening and closing the said box-flue, for the purposes of permitting the escape of the foul air from a room and of regulating its escape therefrom, all of which will more fully hereinafter appear.

In the accompanying drawing, the pane of glass A, Figs. 3 and 4, is provided with the transparent box-flue B on its inside. The box-flue B communicates with the outside of the pane A, and is provided at its lower or discharge end with the damper C. The box-flue B is used to prevent a direct draft into the room when the damper C is open, which could not be prevented were the box-flue B dispensed with and the damper C placed in the opening in the pane A, at the upper arrow in Fig. 4. The damper C in Fig. 4 is shown closed by section lines, and open by dotted lines. The damper C is provided with a finger-piece, D, by which it may be turned to open and close the box-flue B. The pane of glass E, Figs. 1 and 2, is provided with a box-flue, F, upon its outside, which communicates with the inside of the room when in operation, and is provided at its upper or discharge end with the damper G. (Shown closed in Fig. 2 by section lines and open by dotted lines.) A flange or bead, H, upon the outside of the pane E produces, in conjunction with the inner edge of the damper G, a tight joint. The damper G is pivoted eccentrically in its bearings in such a manner that the outer portion thereof is made heavier than the inner portion. Consequently, when the damper is turned upwardly beyond a vertical position it will fall back against the surface of the pane E and remain in that position until designedly displaced, which displacement may be effected by bearing against the upper side of the lower portion of the damper G with a stick inserted into the box-flue F from the inside or bottom of the flue. The damper G may be also opened by inserting a stick into the flue F and pushing upwardly until the damper falls back against the surface of the pane E. The box-flues B and F are made with and form parts of the panes A and E. The dampers C and G may be made in various ways—that is to say, their bearings may be formed by making journals on their ends, or by making sockets in their ends and inserting the journals into the said sockets through proper openings in the sides of the box-flues B and F.

The operation of the invention is obvious. Fresh air may be admitted through the box-flue B by opening the damper C without permitting a direct draft into the room, and the air may be excluded by closing the damper C. The foul air may be permitted to escape by opening the damper G in the box-flue F, as before described, or the air may be confined by closing the said damper G.

The ventilators, forming parts of the window itself, are always in place, do not obstruct the light, and are so arranged—one upon the inside of the lower sash and one upon the outside of the upper sash—as never to interfere with the opening and closing of either of the sashes. Besides, they can be kept in all sizes and ready for sale in the market just the same as ordinary window-glass.

Having thus described my invention, what

I claim as new and useful, and desire to secure by Letters Patent, is—

1. A ventilator for windows, consisting of the pane of glass A, having on its outside the transparent box-flue B, provided with the damper C D, substantially as and for the purposes set forth.

2. A ventilator for windows, consisting of the transparent box-flue F, provided with the damper G, and forming a part of the pane E, substantially as and for the purposes set forth.

3. A window provided with the ventilating-pane A, having the box-flue B, controlled by the damper C, and the pane E, having the box-flue F, controlled by the damper G, substantially as and for the purposes set forth.

In testimony that I claim the foregoing improvements, as above described, I have hereunto set my hand and seal this 6th day of February, 1875.

GEORGE WAGNER. [L. S.]

Witnesses:
 THOMAS J. GODWIN,
 F. S. PERLEY.